US008996427B2

(12) United States Patent
Walker

(10) Patent No.: US 8,996,427 B2
(45) Date of Patent: Mar. 31, 2015

(54) METHOD FOR A SYSTEM THAT SOLVES MULTIMEDIA RESOURCE DISCOVERY AND RETRIEVAL PROBLEM SETS

(75) Inventor: Reginald L Walker, Los Angeles, CA (US)

(73) Assignee: Tapicu, Inc., Los Angeles, CA (US)

( * ) Notice: Subject to any disclaimer, the term of this patent is extended or adjusted under 35 U.S.C. 154(b) by 0 days.

(21) Appl. No.: 13/135,962

(22) Filed: Jul. 19, 2011

(65) Prior Publication Data

US 2012/0016820 A1 Jan. 19, 2012

Related U.S. Application Data

(60) Provisional application No. 61/399,937, filed on Jul. 19, 2010.

(51) Int. Cl.
G06F 15/18 (2006.01)
G06F 17/30 (2006.01)

(52) U.S. Cl.
CPC .................................. *G06F 17/3002* (2013.01)
USPC ........................................................ 706/12

(58) Field of Classification Search
None
See application file for complete search history.

(56) References Cited

U.S. PATENT DOCUMENTS

2009/0089277 A1* 4/2009 Cheslow ........................... 707/5
2010/0174770 A1* 7/2010 Pandya .......................... 709/200

OTHER PUBLICATIONS

Ahmad, Karlapalem, Kwok, So, "Evolutionary Algorithms for Allocating Data in Distributed Database Systems", Distributed and Parallel Databases, vol. 11, Kluwer Academic Publishers. Manufactured in the Netherlands, 2002, pp. 5-32.*
Zhang, Su, Chen, "A Novel Genetic Algorithm for QoS-Aware Web Services Selection", DEECS 2006, LNCS 4055, Springer-Verlag Berlin Heidelberg 2006, pp. 224-235.*
Mari, Poggi, Tomaiuolo, Turci, "Enhancing Information Sharing Through Agents", AOIS 2006, LNAI 4898, Springer-Verlag Berlin Heidelberg 2008, pp. 202-211.*
Walker, "Purposive behavior of honeybees as the basis of an experimental search engine". Soft Computing, vol. 11(8), 2005, pp. 697-716.*

(Continued)

*Primary Examiner* — Kakali Chaki
*Assistant Examiner* — Walter Hanchak

(57) ABSTRACT

A method is described for applying distributed stochastic optimization techniques of evolutionary computation using a plurality of servers and a plurality of clients machines being connected via a computer network such as the Internet. The stochastic optimization techniques of evolutionary computation seek to optimize a populations of individuals against one or more predetermined fitness criteria when applied to solving solve the network routing problem coupled with one or more information retrieval problems. The field of evolutionary computation encompasses stochastic optimization techniques, such as randomized search strategies, in the form of evolutionary strategies (ES), evolutionary programming (EP), genetic algorithms (GA), classifier systems, evolvable hardware (EHW), and genetic programming (GP). The stochastic optimization component objectives of the multimedia resource discovery and retrieval systems includes maximization of resource utilization and of overall LAN throughput.

10 Claims, 2 Drawing Sheets

(56) References Cited

OTHER PUBLICATIONS

Reginald L. Walker, "Dynamic Load Balancing Model: Preliminary Results for Parallel Pseudo-search Engine Indexers/Crawler Mechanisms Using MPI and Genetic Programming", from J.M.L.M. Palma et al. (Eds.): VECPAR2000, LNCS 1981, Springer-Verlag Berlin Heidelberg, 2001, pp. 61-74.*

Reginald L. Walker, "Purposive Behavior of Honeybees as the Basis of an Experimental Search Engine", Soft Computing, vol. 11, 2007, pp. 697-716.*

* cited by examiner

METHOD FOR A SYSTEM THAT SOLVES MULTIMEDIA RESOURCE DISCOVERY AND RETRIEVAL PROBLEM SETS

CROSS-REFERENCE TO RELATED APPLICATIONS

This application claims benefit of provisional application Ser. No. 61/399,937, filed on Jul. 19, 2010 by the present inventor.

FEDERALLY SPONSORED RESEARCH

Not Applicable

SEQUENCE LISTING OR PROGRAM

Not Applicable

BACKGROUND OF THE INVENTION

The present invention relates to the stochastic optimization of evolutionary computation (EC) search strategy parameters in a distributed fashion across a plurality of servers and a plurality of clients which are connected together by a network, such as the Internet. In particular, it relates to stochastic optimization search strategies for a multimedia resource discovery and retrieval system for computer information sharing systems such as search engines, data warehouses, and service oriented architectures (SOAs). The multimedia resource discovery and retrieval system uses a plurality of stochastic optimization agents to adaptively solve the network routing problem coupled with one or more information retrieval (IR) problems. The field of evolutionary computation encompasses stochastic optimization techniques, such as randomized search strategies, in the form of evolutionary strategies (ES), evolutionary programming (EP), genetic algorithms (GA), classifier systems, evolvable hardware (EHW), and genetic programming (GP).

There has always been a need to iteratively improve the retrieval of remotely located multimedia files (images, text, audio, and video). The stochastic optimization techniques of evolutionary computation (EC) contain mechanisms which enable the representation of certain unique aspects of individual (agent) behavior to adaptively improve multimedia resource discovery and retrieval mechanisms. Principles of the stochastic optimization techniques of EC can be found for example in Walker (2003) "*Tocorime Apicu: Design of an Experimental Search Engine Using an Information Sharing Model*", University of California Dissertation, UMI Dissertation Publishing, Ann Arbor, Mich. 48106-1346 which is incorporated by reference herein in its entirety.

The chief differences among the various types of EC stem from: 1) the representation of solutions (known as individuals in EC), 2) the design of the variation operators (mutation and/or recombination—also known as crossover), and 3) selection mechanisms. A common strength of these optimization approaches lies in the use of hybrid algorithms derived by combining one or more of the evolutionary search methodologies. The underlying optimization methodologies of EC are used to implement unique stochastic aspects of search strategies.

A hybrid of the stochastic optimization techniques of evolutionary computation (EC) provides a computational optimization strategy for problems which are difficult to solve using conventional mathematical techniques, such as the network routing problem coupled with one or more information retrieval problems. They are particularly applied to highly complex situations, where a very large number of variable parameters prevent any formal attempt at a solution. A typical example of such a problem is where a Web crawlers must visit all of the possible number of IP addresses (there are $2^{32}$ possible Ipv4 addresses) supporting multimedia services and retrieval all text documents—based on the class structures associated with the Ipv4 and eventually, the IPv6 protocols $2^{128}$ or 3.4 B $10^{38}$ possible network addresses). Class A can support up to $2^7$ (approximately 128) networks, class B can support up to $2^{14}$ (approximately 16384) networks, and class C can support up to $2^{21}$ (approximately 2 million) networks. When the number of sites to be visited is very large, it is not feasible to determine a solution by an exhaustive calculation of the distance for every possible route (this is sometimes referred to as the "traveling salesman" problem).

Information processing associated with the stochastic optimization component of multimedia resource discovery and retrieval systems is hampered by the stochastic information fluctuations that occur each second within the Internet. The multimedia resource discovery and retrieval model encompasses policies and processes that require mechanisms capable of adaptively adjusting operational parameters. These parameters are required to filter, organize, and index any large-scale data set—information stored on a single computer, a local area network (LAN), and a wide area network (WAN) that encompasses the whole Internet—that may consists of constantly fluctuating information content over relatively short periods of time. Additionally, the model (or its individual components) can be applied to hosts of existing multimedia systems that require mechanisms to locate new and updated information in a timely manner, mechanisms to integrate new information into existing knowledge bases, and software to extract, analyze, and disseminate information from large-scale data sets.

Instead, one way of addressing network routing problems is to use stochastic optimization agents that are derive from hybrids of the stochastic optimization techniques of evolutionary computation. According to this approach, sets of different possible routes are selected, each being typically represented in practical implementations by a fixed length string, and the distance for each selected route is calculated (this is known as the "fitness"). Then, a new set of routes is generated by forming essentially random combinations of routes from the preceding set, with those routes having the shortest distances (i.e. best fitness) being preferentially selected for the reproduction of routes for the next generation. The fitness of each member of the new generation is then calculated, and the process is repeated, for example until a predetermined number of generations are reached, or until an individual having a particular fitness level has been produced.

Thus the hybrid stochastic optimization techniques of evolutionary computation mimics natural evolution, in that for each generation, the least successful members are destroyed, and only the most successful members produce progeny for the next generation. In time, it is hoped that the quality of the population steadily improves, eventually leading to an optimal solution. In simplest terms, each cycle of the hybrid stochastic optimization techniques of evolutionary computation involves an evaluation phase for the current population, and then a generation phase, for producing the next generation.

The efficiency of Internet applications is often tested by adding new applications that compete for shared network resources. Studies associated with network traffic show the need for adaptive congestion control and avoidance at the application level. The side-effects resulting from non-adaptive applications include burstiness (degree of self-similarity) in network transmissions. New applications, such as the transmission of multimedia data coupled with current network traffic, provide a hierarchical ordering based on the priority and diversity of data transmissions.

The file types associated with multimedia Web transmissions are reduced to images, text, audio, and video. It has been shown that Internet traffic associated with multimedia (text only) file transfers introduced the least network congestion. The addition of image, audio, and/or video transmissions associated with document/file transmissions tends to cause heavy-tailed traffic distributions. The heavy-tailed distributions reflect active/inactive periods and varying sizes of multimedia files. The coupling of information organization with retrieval systems contributes to self-similarity in Internet traffic.

It is the goal of this invention to provide a system and method for reducing the computational effort to achieve periodic optimal multimedia resource discovery and retrieval from a host of diverse multimedia sources.

BACKGROUND OF THE INVENTION

Objectives

Accordingly, the objectives and advantages of the invention are as follows:

It is an objective of the present invention to use stochastic optimization agents formed from hybrid algorithms derived by combining one or more of the evolutionary computation search methodologies.

It is another objective of the present invention to encompass policies and processes that require mechanisms capable of adaptively adjusting operational parameters required to filter, organize, and index any large-scale data set—information stored on a single computer, a local area network (LAN), and a wide area network (WAN)—that may consists of constantly fluctuating information content over relatively short periods of time.

It is another objective of the present invention to represent solutions as memes to reduce in the computational effort to achieve the periodic optimal document clusters. The fitness of a species can be improved by the non-genetic transmission of cultural information that uses a meme as the transmission mechanism rather than the genetically based gene. The difference between the two includes the fact that genetic transmissions (stochastic selection process) evolve over a period of generations, whereas cultural transmissions result from an educational process.

SUMMARY OF THE INVENTION

According to the invention there is provided a multimedia resource discovery and retrieval system comprising:

a. Decentralized retrieval of multimedia files located throughout a local area network (LAN), and a wide area network (WAN) combine adaptive solutions achieved by the various the stochastic optimization agents of multimedia resource discovery and retrieval system to the network routing problem coupled with one or more information retrieval problems. The objectives are to achieved: 1) maximization of resource utilization and of overall LAN throughput, and 2) minimization of rejected request packets and guarantee quality of service (QoS). The network routing procedure requires shortest path routing that minimizes "hops" between the source and randomly chosen Internet service providers (ISPs). Factors that must be considered are connection requirements (end-to-end delay, delay variation, mean rate) and network conditions, and b. Real-time system constraints that require timeliness and correctness of periodic tasks, sporadic tasks, and aperiodic tasks executed by the stochastic optimization agents. The periodic tasks are those with fixed time requirements, sporadic tasks are governed by some minimum inter-arrival time, and aperiodic tasks are governed by some stochastic assumptions. Generally, skip-over scheduling is applied to all these tasks since the Internet's workload fluctuates. The skip-over policy defers those jobs which jeopardize the new job's deadlines. These deferred jobs are placed at the end of the scheduling queue in order to reassess the stochastic optimization parameters of optimization agents in order to meet the QoS requirements. The stochastic optimization search and retrieval strategies require that QoS and quality of information sharing be maintained for each ISP hosting multimedia services in order to efficiently retrieve multimedia files.

DETAILED DESCRIPTION OF THE DRAWINGS

Figures

DETAILED DESCRIPTION

Preferred Embodiments

A preferred embodiment of the present invention is now described with reference to the figures where like reference numbers indicate identical or functionally similar elements.

Some portions of the detailed descriptions that follow are presented in terms of stochastic optimization agents which can be implemented by those skilled in data processing art to most effectively convey the substance of their work to others skilled in the art. It should be noted that the stochastic optimization agents of the present invention could be embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in a computer. Furthermore, the computers referred to in the specifications may include a single processor or may be architectures employing multiple processor designs for increased computing capability.

The stochastic optimization agents presented herein are not inherently related to any particular computer of other apparatus. Various general-purpose systems may also be used with programs in accordance with the teaching herein, or it may prove convenient to construct more specialized apparatus. The required structure for a variety of these systems will appear from the description below. In addition, the present invention is not described with reference to any programming language. It will be appreciated that a variety of programming languages may be used to implement the teachings of the present invention as describe herein, and any references below to specific languages are provided for disclosure of enablement and best mode of the present invention.

Accordingly, the disclosure of the present invention is intended to be illustrative, but not limiting, of the scope of the invention, which is set forth in the claims.

1. Notational Conventions

Figure 1:
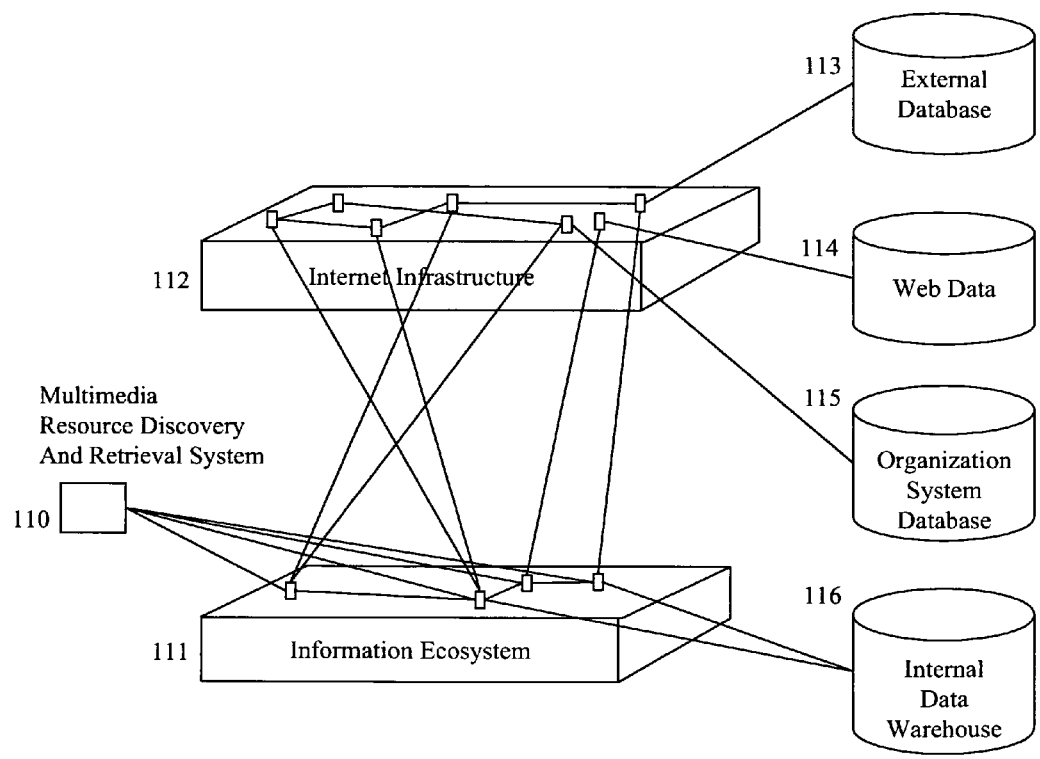
FIG. 1 is a diagram showing application layer portion of the software architecture of the present invention.

FIG. 1 provides an overview of the processing completed by the stochastic optimization agents of the multimedia resource discovery and retrieval system. Processing starts in this system 110 when the data extraction portion of the stochastic optimization component extract multimedia files from a mapping of an information ecosystem 111 to selected areas of the network structure of the Internet infrastructure 112 which provides access to external databases 113, Web data 114, organization system databases 115, or internal data warehouses 116.

Figure 2:
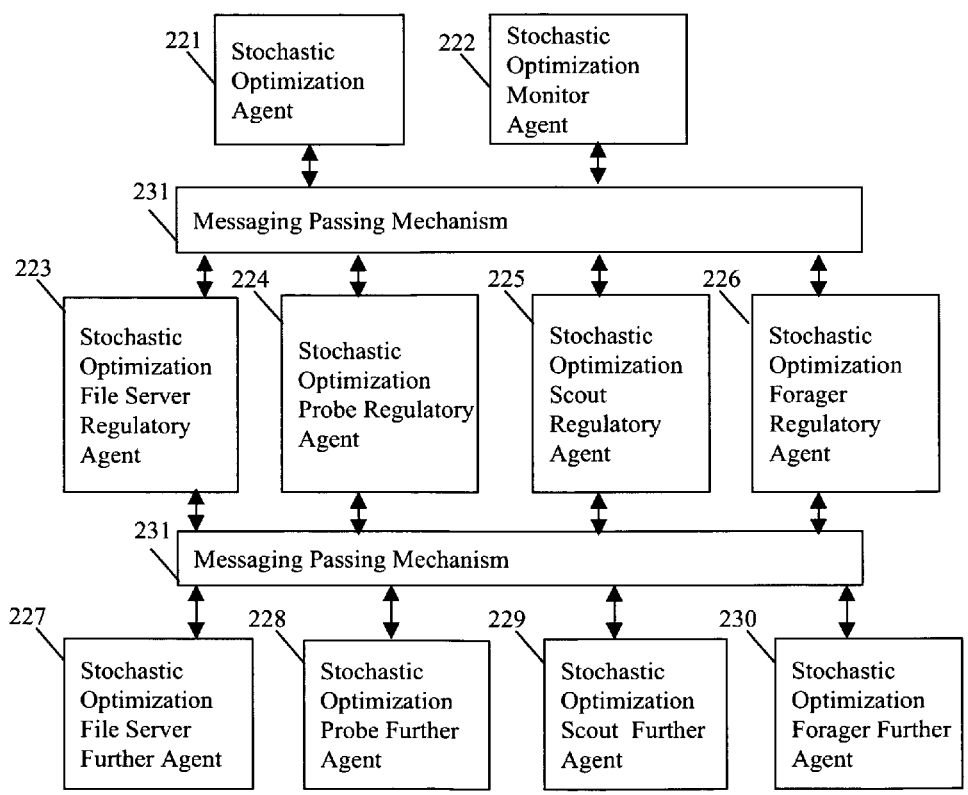
FIG. 2 is a block diagram of the multimedia resource discovery and retrieval system embodying the invention.

FIG. 2 presents the adaptive stochastic optimization agents 221-230 for the stochastic optimization component of multimedia resource discovery and retrieval system based on the information discovery model. This model has built-in mechanisms that allow each stochastic optimization agent to adapt its operational parameters to a changing environment. The stochastic optimization agents 221-230 are applied to the ever-changing environment of local area network (LAN) and/or a wide area network (WAN) traffic which varies considerably, depending on: 1) time of day, 2) time zones, 3) various holiday and/or vacation patterns that exist throughout the world, and 4) naturally occurring disasters. The stochastic optimization further agents 228-230 communicate via message passing mechanisms 231,232, and emulate stochastic optimization information search strategies for: locating forage sources, and detecting and avoiding foraging congestion.

Stochastic optimization probe further agents 228 are deployed throughout the information ecosystem 111 in search of ISPs hosting multimedia services in order to initiate the development of customized routes for the retrieval of multimedia files by stochastic optimization forager further agents 230. Stochastic optimization scout further agents 229 use information obtained by the stochastic optimization probe further agents 228 to detect network congestion. The various objectives just mentioned are monitored by the stochastic optimization agents 221,222 and stochastic optimization regulatory agents 223-226 using resealed adjusted range (RS) statistics.

The stochastic optimization agents 221,222 focus on performance monitoring of the interaction between stochastic optimization regulatory agents 223-226. The stochastic optimization probe agents 224,228 and stochastic optimization forager agents 225,229 form crucial components of the stochastic optimization component of the multimedia resource discovery and retrieval systems. Each located ISP is identified as useful by stochastic optimization probe regulatory agents 224 if it provides the desired multimedia services. These marked sites are provided to the stochastic optimization scout regulatory agent 225. The stochastic optimization probe further agents 228 are not concerned with network congestion or any other aspect of file retrieval. The stochastic optimization scout regulatory agents 225 proceed with the site metrics provided by only its group stochastic optimization probe regulatory agents 224. Stochastic optimization scout further agents 229 are released to each selected site periodically to gather and update information ecosystem 111 congestion traffic metrics. The stochastic optimization scout regulatory agent 225 use these metrics on a per-site basis to determine the feasibility of retrieving multimedia files from a selected site. Site rankings are based on the results of the feasibility tests which use RS statistics to perform time series analysis on each site's congestion metrics. The feasibility results for each site vary based on the time of day, time zone location with respect to the location of the stochastic optimization agents of multimedia resource discovery and retrieval system, localized holiday and vacation patterns, and natural disasters. The periodic feasibility update of each site occurs within a random time period and is based on the workload of each stochastic optimization scout regulatory agent 225 and stochastic optimization forager regulatory agent 226 coupled with the update rate of the newly located sites provided by its corresponding stochastic optimization probe regulatory agents 224.

The stochastic optimization regulatory agents 223-226 contain those features essential for releasing and coordinating the stochastic optimization further agents 227-230. Each stochastic optimization regulatory agents 223-226 has a finite scope, limiting its activity to those ISPs inscribed within an area whose radius is given by a value V (its visibility).

The stochastic optimization probe regulatory agent 224 provide stochastic optimization scout regulatory agent 225 with results in the form of IP addresses reflecting initial visits to random ISPs. The stochastic optimization scout regulatory agent 225 uses the IP address of the appropriate ISP in order to start the process of determining/charting the optimal (customized) route using RS statistics. The stochastic optimization forager regulatory agent 226 uses the selected IP address if the RS statistics indicate that the corresponding information server meets the required QoS. This methodology has the ability to discover new ISPs as well as new sub-hosts, thus providing services to both new and existing information clients—this in turn resulting in faster discovery of new and updated documents. Each stochastic optimization further agent 227-230 is:

1. Reactive—can interact with the information ecosystem 111 within appropriate time limits
2. Independent—can act on its own
3. Robust—can cope with the ever-changing network environment within the information ecosystem The efficiency of the stochastic optimization forager further agents 230 is due to customized ISP router tables which are discovered by the stochastic optimization scout further agents 229—the result of periodic searches for optimized routes that exist for short periods of time. The initial step in this methodology is the releasing of stochastic optimization probe further agents 228 for all ISPs in a manner similar to reliable flooding.

The rapid release of a series of stochastic optimization further agents (probe/scout/forager sets 228-230) can have an adverse affect on the receiving host (ISP server) as well as on the releasing stochastic optimization regulatory agent 224-226. Each stochastic optimization regulatory agent 223-226 creates a series of stochastic optimization further agents 227-230 which can exhaust the resources of the system resources allocated to the stochastic optimization regulatory agent 223-226. The stochastic optimization further agents 228-230 are most effective in the event/case of reliable flooding, where monitoring stochastic optimization agents 221,222 and stochastic optimization regulatory agents 224-226 are used to adequately control and coordinate valuable information returned by each individual process. The ISP hosting multimedia services may interpret the simultaneous requests as a form of flooding, resulting in requests being queued at the router level and/or server level. In the worst-case scenario, the life-span of a stochastic optimization further agent agents 228-230 will exceed the amount of time needed to establish communication with the selected ISP and retrieve the requested information. Attempts to avoid worst-case scenarios are made through the use of RS statistics provided by the stochastic optimization scout further agents 229.

The stochastic optimization regulatory agents 223-226 needed for retrieving multimedia documents require some form of adaptive methodology since each stochastic optimization further agent 227-230 searches for efficient paths (routes) to an uncongested source of information (documents) in order to build the stochastic optimization component of multimedia resource discovery and retrieval system ISP router tables.

The stochastic optimization forager regulatory agent 226 receives input from the stochastic optimization scout regulatory agent 225 which makes retrieval decisions based on the conversion of congestion detection information into high-level congestion avoidance mechanisms before releasing stochastic optimization forager further agents 230. The release of stochastic optimization forager further agents 230 can only occur if the stochastic optimization scout regulatory agent 225 indicates that the feasibility results pass the QoS requirements imposed by the stochastic optimization component of multimedia resource discovery and retrieval systems. This layer of congestion avoidance incorporates network metrics from mechanisms used to customize routes between the location of the stochastic optimization component of multimedia resource discovery and retrieval systems and each selected ISP. Snapshots of source/destination traffic flow can change drastically over relatively short periods of time—depending on the release and return of each stochastic optimization scout further agents 229. The second layer of congestion avoidance is handled implicitly by information ecosystem and Internet routers and switches 111,112 between the source 110 and destination 113,114,115,116.

I claim:

1. A method of applying distributed stochastic optimization techniques of evolutionary computation using a plurality of servers and a plurality of clients machines being connected via a computer network, said stochastic optimization techniques of evolutionary computation aiming to optimize a population of individuals against one or more predetermined fitness criteria, wherein the computer code instructions are invoked by stochastic optimization agents;
    said method for applying distributed stochastic optimization techniques of evolutionary computation including the steps of:
    i. requesting multimedia services provided by a plurality of servers to generate a population of individuals, the requesting including transmitting at least one meme generated from cultural information for the population of individuals by the client machines;
    ii. requesting QoS statistics of the multimedia services provided by a plurality of servers;
    iii. generating a population of individual routing tables for a plurality of servers by said client machines;
    iv. requesting a plurality of servers to generate a population of multimedia documents to be downloaded from the plurality of servers by said client machines;
    v. responsive to said requesting step, distributing individuals from said population of individuals from the plurality of servers across plurality of client machines by downloading individuals from the requesting client machine agents to the corresponding non-requesting client machine agents;
    vi. evaluating the fitness of each distributed individual using at least one transmitted meme obtained from cultural information at a client machine by a stochastic optimization agent; and
    vii. identifying the individual(s) best satisfying said one or more predetermined fitness criteria, based on results of said evaluating step.

2. The method of claim 1, where each of a plurality of client machines runs a text-only World Wide Web browser.

3. The method of claim 2, where the said computer network is the Ethernet local area network (LAN) as well as disjoint computer system such as the Internet.

4. The method of claim 2, further comprising the discovering, requesting, retrieving, and indexing steps: each step using the individuals evaluated as having the best fitness to produce a new generation of individuals.

5. The method of claim 4, further comprising: the discovering, requesting, retrieving, and indexing steps: each step sharing the new generation of requested individuals with discovering, requesting, retrieving, indexing steps of non-requesting client machine agents.

6. The method of claim 4, further comprising: initial steps of creating the first generation of individuals including at least one meme from cultural information at said plurality of discovering, requesting, retrieving, and indexing client machines.

7. The method of claim 1, wherein each of said plurality of client machines can commence or terminate their request from the plurality of servers at any time.

8. The method of claim 1, wherein each of said plurality of server machines can commence or terminate their response with the plurality of client machines at any time.

9. The method of claim 2, further comprising: initial steps of creating the first generation of individuals including at least one meme from cultural information at said plurality of discovering, requesting, retrieving, and indexing client machines.

10. A system for applying distributed stochastic optimization techniques of evolutionary computation using a plurality servers and a plurality of clients machines, the server and client machines being connected via a computer network, said stochastic optimization techniques of evolutionary computation aiming to optimize a population of individuals against one or more predetermined fitness criteria, wherein the computer code instructions are invoked by stochastic optimization agents; said means for applying distributed stochastic optimization techniques of evolutionary computation including steps of:
    i. requesting multimedia services provided by a plurality of servers to generate a population of individuals, the requesting including transmitting at least one meme generated from cultural information for the population of individuals by the client machines;
    ii. requesting QoS statistics of the multimedia services provided by a plurality of servers;
    iii. generating a population of individual routing tables for a plurality of servers by said client machines;
    iv. requesting a plurality of servers to generate a population of multimedia documents to be downloaded from the plurality of servers by said client machines;
    v. responsive to said requesting step, distributing individuals from said population of individuals from the plurality of servers across plurality of client machines by downloading individuals from the requesting client machine agents to the corresponding non-requesting client machine agents;

vi. evaluating the fitness of each distributed individual using at least one transmitted meme obtained from cultural information at a client machine by a stochastic optimization agent; and vii. identifying the individual(s) best satisfying said one or more predetermined fitness criteria, based on results of said evaluating step.

\* \* \* \* \*